United States Patent [19]

Fujio et al.

[11] Patent Number: 5,051,488
[45] Date of Patent: Sep. 24, 1991

[54] ORGANIC GLASS WITH HIGH REFRACTIVE INDEX

[75] Inventors: Yoshiharu Fujio, Itami; Kanemasa Matsukuma, Amagasaki, both of Japan

[73] Assignee: Daiso Co., Ltd., Osaka, Japan

[21] Appl. No.: 505,487

[22] Filed: Apr. 6, 1990

[30] Foreign Application Priority Data

Apr. 12, 1989 [JP] Japan ................................ 1-93597

[51] Int. Cl.$^5$ ............................................. C08F 18/16
[52] U.S. Cl. ................................................. 526/322
[58] Field of Search ......................................... 526/322

[56] References Cited

U.S. PATENT DOCUMENTS

| | | |
|---|---|---|
| 2,964,501 | 12/1960 | Sarofeen . |
| 4,598,133 | 7/1986 | Makino et al. .................. 526/322 |
| 4,879,363 | 11/1989 | Fujio et al. . |

FOREIGN PATENT DOCUMENTS

| | | |
|---|---|---|
| 0312091 | 4/1989 | European Pat. Off. . |
| 49-32944 | 3/1974 | Japan .................................. 526/322 |
| 49-16272 | 4/1974 | Japan .................................. 526/322 |
| 0015513 | 1/1983 | Japan .................................. 526/322 |
| 0201812 | 11/1983 | Japan .................................. 526/322 |
| 81318 | 5/1984 | Japan . |
| 59-081318 | 5/1984 | Japan . |
| 0001212 | 1/1985 | Japan .................................. 526/322 |
| 61-183306 | 8/1986 | Japan .................................. 526/322 |
| 63-015813 | 1/1988 | Japan . |
| 15813 | 1/1988 | Japan . |
| 63-043911 | 2/1988 | Japan . |
| 43911 | 2/1988 | Japan . |
| 2155939 | 10/1985 | United Kingdom . |

*Primary Examiner*—Joseph L. Schofer
*Assistant Examiner*—N. Sarofim
*Attorney, Agent, or Firm*—Wegner, Cantor, Mueller & Player

[57] ABSTRACT

Novel organic glass with a high refractive index comprising a copolymer of (a) a diallyl isophthalate monomer, (b) an allyl or methallyl benzoate monomer and (c) a diester of maleic acid and/or diester of fumaric acid monomer, which also shows excellent light resistance and excellent other physical properties such as excellent moldability, high impact resistance, high dimension stability, excellent mechanical processing properties, excellent dyeability and excellent hard coating property, and is useful as a material for optical or optoelectronic parts such as lenses, prisms, reflecting mirror and window materials.

7 Claims, No Drawings

ORGANIC GLASS WITH HIGH REFRACTIVE INDEX

This invention relates to an organic glass with a high refractive index suitable as a material for optical parts, more particularly to a novel organic glass with a high refractive index comprising a copolymer of (a) a diallyl isophthalate monomer, (b) an allyl benzoate monomer and (c) a diester of maleic acid monomer and/or a diester of fumaric acid monomer, which also has excellent other physical properties such as excellent light resistance, high impact resistance, high dimension stability, excellent mechanical processing properties, excellent dyeability, excellent hard coating property (e.g. excellent adhesion of coating glass film), and the like and is useful as a material for optical parts such as lenses and prisms.

Prior Art

Organic glass has been noticed as a material for optical parts, particularly lenses because of its light weight in comparison with inorganic glass, and organic glass comprising a polymer of diethylene glycol bis(allyl carbonate) or methyl methacrylate or the like has been used as a lens material. Among known organic glasses, organic glass comprising a polymer of diethylene glycol bis(allylcarbonate) (CR-39) has light weight and excellent other physical properties such as high impact resistance, high dimension stability, excellent mechanical processing properties, excellent dyeability and excellent hard coating property, and hence, the demand for it has rapidly increased for using it as a lens material for eyeglasses, i.e. for correcting one's eyesight instead of using inorganic glass in about the last ten years.

Although the organic glass comprising a polymer of diethylene glycol bis(allyl carbonate) has excellent properties as optical material, as mentioned above, it has a refractive index of 1.499 which is lower than that of the conventional crown glass (inorganic glass) (its refractive index is 1.523). When this organic glass is used as a lens material for eyeglasses, it must be made thicker in comparison with an inorganic glass material, so that the material loses its merit of light weight and further the eyeglasses becomes unattractive. This tendency becomes stronger with incease of diopter of lens. Accordingly, the conventional organic glass is not necessarily suitable as a lens material for eyeglasses.

In order to eliminate these drawbacks of the conventional organic glass, there have recently been developed various lens materials comprising diallyl phthalate polymers or bisphenol A derivatives which have higher refractive index, for examples polymers of 2,2-bis(4-methacryloxyethoxyphenyl)propane, 2,2-bis(4-methacryloxyethoxy-3,5-dibromophenyl)propane, and the like, but these lens materials having a high refractive index are somewhat disadvantageous in exhibiting less impact resistance and less processability and hence are still not necessarily satisfactory as a lens material for eyeglasses.

It is disclosed in Japanese Patent First Publication (Kokai) No. 81318/1984 that an organic glass comprising a copolymer of diallyl phthalate and unsaturated alcohol esters of benzoic acid (e.g. allyl benzoate) has an improved impact resistance and is useful as a lens material for eyeglasses. Although this organic glass is quite excellent in molding properties, impact resistance and mechanical processing properties, it has disadvantages such as extremely high yellowing by outdoor exposure etc., and hence, is still unsatisfactory as a lens for eyeglasses. In order to improve the light resistance and to prevent the undesirable yellowing, an ultraviolet stabilizer is usually incorporated, but the organic glass comprising the abovementioned copolymer is still not necessarily satisfactory in terms of light resistance even with incorporation of the conventional ultraviolet stabilizer.

It is also disclosed in U.S. Pat. No. 2,964,501 that a terpolymer of (1) 78-98% of an ester of a glycol with an acid ester of a monohydric alcohol (e.g. diethylene glycol bis(allyl carbonate), (2) 1-20% of a diester of a monohydric alcohol (e.g. diallyl phthalate) and (3) 0.25-10% of a dialkyl ester of an alkenedioic acid (e.g. dialkyl esters of maleic acid, fumaric acid, itaconic acid, or citraconic acid) is useful as a lens material. However, this reference does not teach the improvement of light resistance of the product.

It is further disclosed in Japanese Patent First Publication (Kokai) Nos. 15813/1988 and 43911/1988 that a resin prepared by copolymerizing (A) 10-95% of one or more vinyl-containing aromatic carboxylic acid ester monomer (e.g. dially phthalate), (B) 5-50% of a diacrylate monomer (e.g. polyethylene glycol diacrylate) and (C) 1-80% of an unsaturated dibasic acid diester monomer containing an aromatic ring in the ester group is useful as a plastic lens material. However, these references do not teach the improvement of light resistance of the product, either.

SUMMARY DESCRIPTION OF THE INVENTION

Under the circumstances, the present inventors have intensively studied as to many kinds of organic glasses in order to develop an organic glass which has a high refractive index, excellent mechanical properties, chemical properties and optical properties without the drawback of yellowing by light exposure and is useful as a material for optical parts such as lens and prisms, and as a result, have found that a copolymer of three monomer components of a diallyl isophthalate monomer, an allyl benzoate monomer and a diester of maleic acid and/or a diester of fumaric acid monomer showed a highly improved light resistance as well as excellent molding properties, a high impact resistance and excellent processing properties.

An object of the invention is to provide a novel organic glass which has a high refractive index as well as excellent mechanical properties, chemical properties and optical properties with excellent light resistance. Another object of the invention is to provide a novel organic glass with a high refractive index which comprises a copolymer of a diallyl isophthalate monomer, an allyl benzoate monomer and a diester of maleic acid monomer and/or a diester of fumaric acid monomer. These and other objects and advantages of the invention will be apparent to those skilled in the art from the following description.

DETAILED DESCRIPTION OF THE INVENTION

The organic glass with a high refractive index of the invention comprises a copolymer of
 (a) a diallyl isophthalate monomer,
 (b) an allyl benzoate monomer, and
 (c) a diester of maleic acid monomer and/or a diester of fumaric acid monomer.

The diallyl isophthalate monomer (a) may be diallyl isophthalate itself or a combination thereof with a small amount of diallyl orthophthalate and/or diallyl terephthalate.

The allyl benzoate monomer (b) includes allyl benzoate which may optionally be substituted on the benzene ring by a straight chain or branched chain alkyl group having 1 to 6 carbon atoms such as methyl, ethyl, n-propyl, isopropyl, n-butyl, isobutyl, sec-butyl, tert-butyl, n-pentyl, neopentyl, n-hexyl and the like (e.g. allyl o-toluylate, allyl m-toluylate, allyl p-toluylate, allyl p-tert-butylbenzoate, etc.) or a straight chain or branched chain alkoxy group having 1 to 6 carbon atoms such as methoxy, ethoxy, propoxy, isopropoxy, butoxy, isobutoxy, sec-butoxy, tert-butoxy, pentyloxy, isopentyloxy, neopentyloxy, tert-pentyloxy, hexyloxy, and the like (e.g. allyl p-methoxybenzoate, allyl 3,4,5-trimethoxybenzoate, etc.). This component (b) is effective for improving the impact resistance of the diallyl isophthalate without deteriorating its high refractive index.

The diester of maleic acid and/or diester of fumaric acid monomer (c) includes diester of maleic acid or diester of fumaric acid with an alkyl having 1 to 8 carbon atoms (e.g. methyl, ethyl, propyl, butyl, pentyl, hexyl etc.), cyclohexyl, phenyl or benzyl. Each component (c) is used alone or in a combination thereof and is effective for improving light resistance of the organic glass comprising the above components (a) and (b).

These components (a) to (c) are preferably used in a ratio of 40 to 80 wt. %, more preferably 50 to 70 wt. %, of (a) component, 10 to 35 wt. %, more preferably 10 to 30 wt. %, of (b) component, and 5 to 50 wt. %, more preferably 10 to 30 wt., of (c) component.

As mentioned above, the component (b) is effective for improving impact resistance of the cured product, and hence, when it is used in an amount of less than 10 wt. %, the effect for improving the impact resistance is insufficient, and on the other hand, when the amount is over 35 wt. %, the product shows unfavorably lower heat distortion temperature and hence shows inferior dimension stability and processability. The component (c) has excellent light resistance by itself and can give the excellent light resistance to the cured product. When the component (c) is used in an amount of less than 5 wt. %, the above excellent properties can not sufficiently be given to the cured product, and on the other hand, when the amount is over 50 wt. %, the refractive index of the cured product is disadvantageously lowered. Since the component (c) affects the refractive index of the cured product as mentioned above, the degree of the effect being depended on the kind of the compound (c), i.e. the alcohol moiety of the ester, the amount of the component (c) should carefully be determined within the range of less than 50 wt. % so that the cured product has the refractive index not less than the lower limit (i.e. 1.54) of the organic glass.

The component (a) should be used in an amount of at least 40 wt. % in order to provide the copolymer with three dimensional crosslinking, insolubility and infusibility, chemical resistance, and heat resistance and dimension stability in practical or processing viewpoint.

The copolymer of the organic glass of the invention may further be incorporated with an appropriate amount of diethylene glycol bis(allylcarbonate) as an additional component within the range capable of providing the refractive index of not less than 1.54 so that the organic glass of the invention can be treated by the conventional hard coating process in order to improve the surface hardness as used for the conventional optical material produced from diethylene glycol bis(allylcarbonate).

The organic glass of this invention can be prepared by copolymerizing the above components (a) to (c) by any conventional method, for example by a casting method, in the presence of a polymerization initiator. The copolymerization can also be carried out with irradiation by ionizing radiation such as X-ray, $\alpha$-ray, $\beta$-ray, and $\gamma$-ray, or ultraviolet.

The organic glass with a high refractive index of this invention comprising the copolymer of diallyl isophthalte, allyl benzoate, and a diester of maleic acid and/or diester of fumaric acid maintains a high refractive index due to diallyl isophthalate and shows excellent light resistance as well as other excellent physical properties, such as excellent moldability, high impact resistance, high dimension stability, excellent mechanical processing properties, excellent dyeability, and excellent hard coating property. Accordingly, the organic glass with a high refractive index of the invention is useful as a material for producing optical or optoelectronic parts such as lens, prisms, reflecting mirror and window materials, particularly lens for eyeglasses. The organic glass of the invention also has an advantage that it can be treated by the conventional hard coating process as used for making the conventional optical material produced from diethylene glycol bis(allylcarbonate).

This invention is illustrated by the following Examples and Reference Examples but should not be construed to be limited thereto.

EXAMPLES 1-9 AND REFERENCE EXAMPLES 1-5

To a mixture of each monomer of the components (a) to (c) as shown in Table 1 is added diisopropyl peroxydicarbonate (4 parts by weight) as a polymerization initiator, and the mixture is poured into a casting mold made of two glass-made circular plates (diameter 70 mm) and a gasket of ethylene-vinyl acetate copolymer wherein the mixture is polymerized. The polymerization reaction is carried out by heating the mixture in a circulating hot air oven at 40° C. for 5 hours, and thereafter, raising gradually the temperature from 40° C. to 80° C. over a period of 11 hours and keeping the temperature at 80° C. for 2 hours, and then cooling gradually to 60° C. After the polymerization reaction, the molded product is released from the casting mold and subjected to heat-treatment at 110° C. for 2 hours. The molded product thus obtained was subjected to the following tests. The test results are shown in Table 2.

(1) Transmittance

It was measured by a luminous transmittance photometer as to a circular test plate (thickness: 2 mm).

(2) Refractive index

It was measured by Abbe refractometer as to the test plate as used in the above (1) which was cut and polished. The index was measured on two crossed surfaces of the polished test plate.

(3) Surface hardness

It was measured according to JIS K-5400 under a load of 1 kgf on the test plate as used in the above (1), and the hardness was shown by the pencil scratch hardness (4) Impact resistance It was measured in accordance with the standard of FDA (Food and Drug Administration, Rules and Regulations §801,410) as to two set of circular specimens (each 10 lenses) having spherical surface radius: 120 mm, thickness: 2 mm and diameter: 70 mm) but having no dioptric power. A steel ball weighing 16 g or 25 g was allowed to drop onto each specimen from a height of 127 cm, and the ratio of not broken specimens to 10 specimens was shown.

(5) Dyeability

The test plate as used in the above (1) was dipped in a brown color dyeing bath at 92° C. for 10 minutes, and thereafter, the luminous transmittance was measured as in the above (1).

(6) Light resistance

Light resistance test was carried out as to the test plate (thickness: 2mm) as used in the above (1) with a fademeter (UV strength: 1 mW/cm$^2$, wave length: 320-390 nm) as prescribed in JAS (Japanese Agricultural Standard) as a light resistance tester. Yellowing by light irradiation was measured as to transmitted light using a color difference meter and indicated as index of color space (b*) (defined in CIE 1976) wherein larger figure shows denser yellow.

TABLE 1

| Ex. No. | Comp. (a) DAIP | Comp. (b) ABZ | Comp. (b) ABBZ | (part by weight) Comp. (c) | | UVS |
|---|---|---|---|---|---|---|
| Ex. 1 | 60 | 20 | — | DEM | 20 | 0.1 |
| Ex. 2 | 70 | 20 | — | DBM | 10 | 0.1 |
| Ex. 3 | 60 | 20 | — | DBM | 20 | 0.1 |
| Ex. 4 | 50 | 20 | — | DBM | 30 | 0.1 |
| Ex. 5 | 60 | — | 20 | DBM | 20 | 0.1 |
| Ex. 6 | 60 | 20 | — | PBZM | 20 | 0.1 |
| Ex. 7 | 60 | 20 | — | DEF | 20 | 0.1 |
| Ex. 8 | 60 | 20 | — | DBF | 20 | 0.1 |
| Ex. 9 | 60 | 20 | — | PBZF | 20 | 0.1 |
| Ref. Ex. 1 | 70 | 30 | — | — | — | — |
| Ref. Ex. 2 | 70 | 30 | — | — | — | 0.1 |
| Ref. Ex. 3 | 70 | 30 | — | — | — | 0.2 |
| Ref. Ex. 4 | 50 | 20 | — | (CR-39) | 30 | 0.1 |
| Ref. Ex. 5 | — | — | — | (CR-39) | 100 | — |

In the above Table 1, the abbreviations mean as follows:
DAIP: diallyl isophthalate
ABZ: allyl benzoate
ABBZ: allyl p-tert-butylbenzoate
DEM: diethyl maleate
DBM: di-n-butyl maleate
PBZM: propylbenzyl maleate
DEF: diethyl fumarate
DBF: di-n-butyl fumarate
PBZF: propylbenzyl fumarate
CR-39: diethylene glycol bis(allylcarbonate)
UVS: 2-(2'-hydroxy-5'-methylphenyl)benzotriazole (UV stabilizer)

TABLE 2

| Ex. No. | Transmittance (%) | Refractive index ($n_D^{25}$) | Surface hardness | Impact strength 16 g | Impact strength 25 g | Dyeability (%) | Light stability (b*) Before irrad. | Light stability (b*) After a day | Light stability (b*) After a month |
|---|---|---|---|---|---|---|---|---|---|
| Ex. 1 | 92 | 1.555 | 2H | 10/10 | 10/10 | 47 | 0.6 | 1.2 | 1.2 |
| Ex. 2 | 92 | 1.565 | 2H | 10/10 | 10/10 | 55 | 0.6 | 1.3 | 1.2 |
| Ex. 3 | 92 | 1.555 | 2H | 10/10 | 10/10 | 48 | 0.5 | 0.9 | 0.8 |
| Ex. 4 | 92 | 1.545 | H | 10/10 | 10/10 | 45 | 0.4 | 0.7 | 0.7 |
| Ex. 5 | 92 | 1.554 | 2H | 10/10 | 10/10 | 47 | 0.5 | 0.9 | 0.8 |
| Ex. 6 | 92 | 1.574 | 2H | 10/10 | 10/10 | 57 | 0.6 | 1.0 | 1.0 |
| Ex. 7 | 92 | 1.555 | 2H | 10/10 | 10/10 | 49 | 0.6 | 1.2 | 1.2 |
| Ex. 8 | 92 | 1.555 | 2H | 10/10 | 10/10 | 50 | 0.5 | 1.0 | 0.9 |
| Ex. 9 | 92 | 1.574 | 2H | 10/10 | 10/10 | 60 | 0.6 | 1.1 | 1.1 |
| Ref. Ex. 1 | 92 | 1.572 | 2H | 10/10 | 10/10 | 52 | 0.3 | 22 | 18 |
| Ref. Ex. 2 | 92 | 1.572 | 2H | 10/10 | 2/10 | 51 | 0.6 | 2.0 | 1.9 |
| Ref. Ex. 3 | 92 | 1.572 | 2H | 10/10 | 10/10 | 50 | 0.9 | 2.1 | 2.0 |
| Ref. Ex. 4 | 92 | 1.550 | 2H | 10/10 | 10/10 | 45 | 0.5 | 1.9 | 1.9 |
| Ref. Ex. 5 | 92 | 1.499 | 2H | 10/10 | 10/10 | 45 | 0.3 | 0.5 | 1.2 |

As is clear from the above test results, the organic glass of this invention had highly improved light resistance as compared with the organic glasses of Reference Examples, maintained the high refractive index and further showed excellent properties necessary for optical parts (e.g. lens) such as excellent dyeability, impact resistance, etc. Table 2 shows that the organic glass of this invention had higher refractive index than that of the conventional CR-39.

What is claimed is:

1. An organic glass with a high refractive index which comprises a copolymer of
   (a) a diallyl isophalate monomer,
   (b) a monomer of allyl or methallyl benzoate in which the benzene ring is unsubstituted or substituted by a straight chain or branched chain alkyl group having 1 to 6 carbon atoms or a straight chain or branched chain alkoxy group having 1 to 6 carbon atoms, and
   (c) a diester of maleic acid and/or diester of fumaric acid monomer.

2. The organic glass according to claim 1, wherein the monomers are in the ratio of 40 to 80 wt. % of the diallyl isophthalate monomer (a), 10 to 35 wt. % of the allyl benzoate monomer (b) and 5 to 50 wt. % of the diester of maleic acid and/or diester of fumaric acid monomer (c).

3. The organic glass according to claim 2, wherein the ratio of the monomers are 50 to 70 wt. % of the diallyl isophthalate monomer (a), 10 to 30 wt. % of the benzoate monomer (b) and 10 to 30 wt. % of the diester of maleic acid and/or diester of fumaric acid monomer (c).

4. The organic glass according to claim 1, wherein the allyl benzoate monomer (b) is allyl benzoate or allyl p-tert-butylbenzoate.

5. The organic glass according to claim 1, wherein the diester of maleic acid and/or diester of fumaric acid monomer (c) is a diester of maleic acid or fumaric acid with an alkyl having 1 to 8 carbon atoms.

6. The organic glass according to claim 5, wherein the diester of maleic acid or diester of fumaric acid monomer (c) is a member selected from the group consisting of diethyl maleate, di-n-butyl meleate, diethyl fumarate and di-n-butyl fumarate.

7. The organic glass according to claim 1, wherein the diester of maleic acid and/or diester of fumaric acid monomer (c) is a diester of maleic acid or fumaric acid with a member selected from the group consisting of an alkyl having 1 to 8 carbon atoms, cyclohexyl, phenyl and benzyl, in which at least one of the ester groups is phenyl or benzyl.

* * * * *